350-363 SR SEAR

OR 3,245,313

T 3095 C

T 2573

April 12, 1966 S. ZAROMB 3,245,313

LIGHT MODULATING MEANS EMPLOYING A SELF-ERASING PLATING SOLUTION

Filed Feb. 23, 1961

INVENTOR.
SOLOMON ZAROMB
BY
F. D. Prager
ATTORNEY

United States Patent Office 3,245,313
Patented Apr. 12, 1966

3,245,313
LIGHT MODULATING MEANS EMPLOYING A SELF-ERASING PLATING SOLUTION

Solomon Zaromb, Philadelphia, Pa., assignor, by mesne assignments, to Philco Corporation, Philadelphia, Pa., a corporation of Delaware Filed Feb. 23, 1961, Ser. No. 91,162
1 Claim. (Cl. 88—61)

This is an improvement over an invention relating to light valves and the like. I made the earlier invention jointly with Raymond H. Lazinski and we described it in a patent application entitled Light Modulators and Method of Modulating Light, filed December 28, 1960, under Serial No. 78,891, assigned to the assignee hereof, and now abandoned. In accordance with the earlier invention a stream of light is controlled by a system, particularly an electric system, for plating-out a film of metal in a body of plating solution exposed to said stream of light and for subsequently deplating said film.

I have used and tested a number of variants of the earlier invention with the object of developing the light valve or light filter so as to modulate light streams of substantial cross section to do so with high speed. In the course of such development I became interested in a system wherein, pursuant to the light modulation by electrolytic plating, the demodulation of the light stream is brought about by removing or "erasing" plated-out metal with the aid of a chemical agent or so-called "oxidizer," rather than by electric action. I discovered that the control of light by means of such a system—"electrical plating, chemical deplating"—provides considerably more than an equivalent of the formerly described system which performed electrical plating and electrical deplating. The opening of the light valve by "chemical deplating" has the interesting feature that it benefits the light valve closing by "electrical plating." It facilitates acceleration of the plating and light shuttering action. It also facilitates application of this light shuttering to relatively large surfaces.

These results and cross-effects seemed surprising; however, I have determined definite reasons for the phenomena and have clearly established the significance thereof. Very briefly, some of these matters can be outlined as follows.

The metal film erasing action of an "oxidizing" agent in the light-controlling plating bath, together with unidirectional application of electric current to this bath, makes it possible to utilize a most desirable plate arrangement, wherein the electrodes are provided by a pair of plates, one facing the other, both of which are light transmissive and both of which have electrically conductive surfaces. This arrangement, which becomes usable only by the employment of the "oxidizer," provides vastly more than just one of several patterns of possible light transmission. It also allows significant reduction of plating resistance. Thus it leads to an increase in the speed of light shuttering action and in the area covered thereby.

These useful but complex relationships between chemical, electrical, and optical features will become clearer upon a study of the new structure and method. I will therefore combine an explanation of these features with the description of an embodiment of the new apparatus, which follows.

Figure 1:
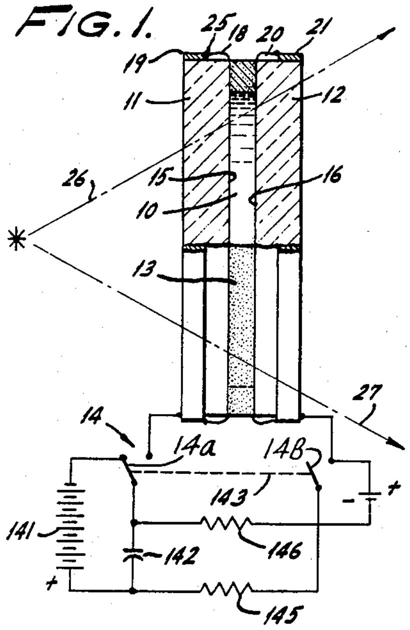
Figure 2:
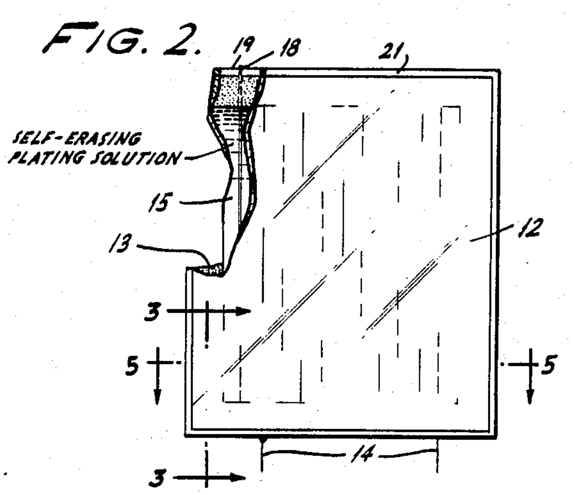
Figures 3, 4:
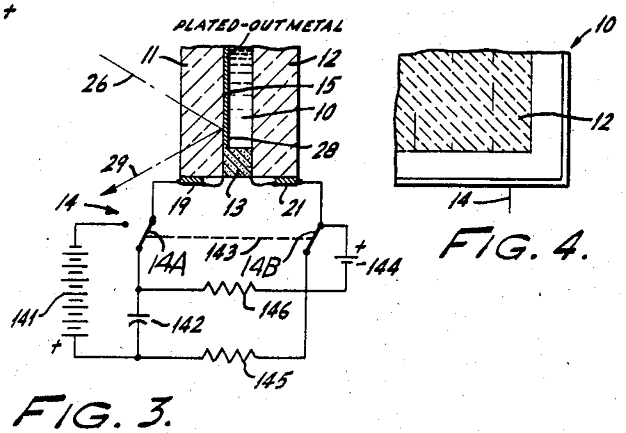
Figure 6:
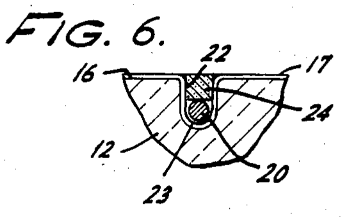
Figure 5:
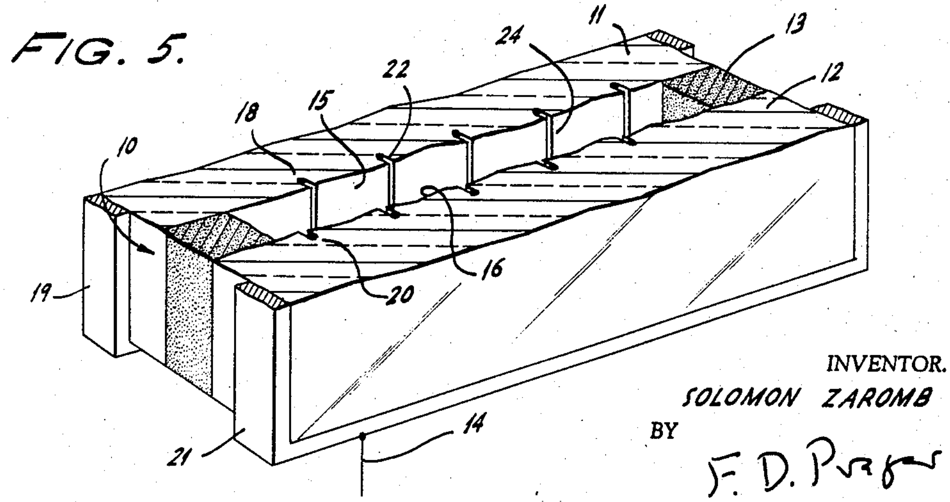

FIGURES 1 and 2 are respectively side and front views of a light valving or filtering cell incorporating my invention, a corner portion being broken off in both figures to disclose the inside of the cell. FIGURES 3 and 4 are similar views of fragments of the same apparatus showing it in a different operative condition, the view of FIGURE 3 being taken along line 3—3 in FIGURE 2. FIGURE 5 is a perspective view taken on a slightly larger scale and showing a lower portion of the cell, the upper portion being broken off along line 5—5 in FIGURE 2. FIGURE 6 is a representation in plan view of a detail from FIGURE 5 on a still larger scale.

In FIGURES 2, 4 and 5 most of the control system is omitted.

Referring first to FIGURES 1 and 2: a body 10 of self-erasing plating solution, as hereinafter defined, is retained by and between a pair of light-transmissive plates 11, 12, made for instance of synthetic plastic or glass and facing one another. These plates are spaced by a frame-shaped gasket 13 and the three elements 11, 12, 13 are bonded together for instance by suitable cementing. Provision is made for light valve opening action by said body of self-erasing plating solution 10, as hereinafter described, and for light valve closing or shuttering action by means of a control circuit 14.

In accordance with the invention this control circuit includes a pair of electrically conductive light transmissive surfaces 15, 16, one on each plate 11, 12, which plates are otherwise of material transparent to light but electrically insulative. In order to provide the conductive, transparent surface, each plate has a very thin, chemically inert, optically transmissive, metal-containing layer or surface structure 17 thereon, as schematically shown in FIGURE 6. The layer can consist for instance of an inert metal oxide, such as tin oxide, applied by vacuum evaporation.

In the preferred embodiment, as shown in FIGURE 5, narrow vertically extending divisions or portions of conductive surface 15 are in contact with parallel vertical wires 18 which connect these divisions to a metallic connector strip 19. That metal strip is disposed on the outside of the container; it forms part of one side of control circuit 14. Wires 20 are similarly related to portions or stripes of the opposite conductive glass surface 16 and to a connector strip 21 forming part of the other side of said circuit.

It is preferred that wires 18, 20 be, as shown, disposed in grooves 22 which are formed in the glass plate surfaces. The conductive coating 17 extends into these grooves (FIGURE 6) and is held in contact with the wires for instance by electrically conductive paint 23, applied to said coating in the grooves and having the wires embedded therein. In order to maintain this contact and also to prevent undesirable chemical attack upon the wires and the conductive paint, the grooves are closed and the wires pressed into the grooves by strips 24 of synthetic resin, forced into the grooves like strips of hydraulic packing, the ends of which are in contact with gasket 13. On the outside of this gasket, ends of wires 18, 20 (FIGURE 1) are connected with strips 19, 21, for instance by solder or weld joints 25.

In the operative condition illustrated in FIGURES 1 and 2 a stream 26 of light passes into and through the plates, surface coatings and solution of cell 11, 12 and emerges from the same as light 27. Arrangement is however made, as is shown in FIGURE 3, for forming a thin film 28 of metal plated-out in the cell, for instance on surface 15 of conductive glass plate 11, and for thereby however made, as is shown in FIGURE 3, for forming a thin film 28 of metal plated-out in the cell, for instance on surface 15 of conductive glass plate 11, and for thereby stopping the emergence of light 27. Most of the incident light 26 can be reflected by such a layer, see 29, or it can of course be absorbed or partly reflected and partly absorbed. In front view the cell is then dark, see FIGURE 4, whereas it otherwise appears bright by virtue of the transmission of light 27 (FIGURE 2).

The light valving effect so produced becomes particularly effective when the space between surfaces 15, 16 is made very narrow and when wires 18, 20 are staggered relative to one another, as shown. This staggering results in high uniformity of plating over the entire cell surface.

For the plating-out of metal layer 28, FIGURE 3, control circuit 14 includes a source of direct current (D.C.) potential such as battery 141, a capacitor 142, and a system of control switches 143. These switches provide a contactor 14A adapted in one position (FIGURE 3) to apply the charge stored in capacitor 142 to the light modulating cell for the plating-out of metal layer 28 and in another position (FIGURE 1) to disconnect the cell and to provide for recharging of the capacitor.

In this latter position of the system the self-erasing plating solution 10 dissolves and erases the plated-out metal film 28.

In the preferred system, illustrated herein, the establishment of this latter position can be postponed and the metal film can be maintained against the film-erasing action of the solution for any desired period of time after discharge of the capacitor. For this purpose I prefer to use a small auxiliary battery 144, shown in FIGURE 3. The arrangement of control circuit 14 is such that by means of a second contactor 14B, provided in switch unit 143, a small plating potential, derived from this auxiliary battery, remains impressed on the cell, starting with the moment when the plating capacitor 142 is connected to the cell and metal film 28 is formed. In this way I counteract the metal film dissolving effect of the chemically aggressive plating solution. Resistors 145, 146 are shown as included in the circuits of power sources 142, 144, respectively, for suitable control of the currents which establish and maintain the metal film and for protecting battery 144 from application of an undesirably large capacitor charge.

It will be noted that the positive side of small battery 144, indicated by a "plus" sign, is connected to connector strip 21, and that the opposite or negative side of small battery 144 is connected to the opposite connector 19, in parallel with the corresponding sides of the capacitor.

Thus it will be seen that establishment of the metal plating and light shuttering position (FIGURE 3) causes disappearance of the light stream 27, which had been transmitted under the condition shown in FIGURE 1; and it will further be seen that such metal plating and light shuttering is followed by establishment of an electric current through the small battery 144 and the cell (FIGURE 3), tending to maintain metal film 28 against the film-erasing tendency of the solution and thus keeping the light valve closed.

Whenever it is desired to re-establish the transmission of light 26 (FIGURE 1), this is readily achieved by the film-destroying chemical action of the plating solution. Such action comes into effect as soon as the film plating, film-maintaining, light shuttering position (FIGURE 3) is disturbed, for instance by either re-establishing the particular, deplating position of FIGURE 1 or by establishing a centered position of switch 143, disconnecting the cell from all sources of film-plating or film-maintaining potential.

In the de-plating position of FIGURE 1 capacitor 142 is recharged by the large battery 141. Application of an excessive charge to the small battery 144 is avoided, that battery being disconnected from the recharging circuit by switch 143.

A particular feature of my improved light modulating cell is connected wtih the use of mutually facing, closely spaced, light-transmissive, electrically conductive surfaces 15, 16. As briefly mentioned above, light valving with the use of this arrangement has been made possible by the employment of a body of self-erasing plating solution 10 between these surfaces.

By means of this feature I substantially avoid a difficulty which accompanies the use of electrolytic action for metal film erasing and film forming: I avoid the plating-out of metal at one electrode while metal is removed from another electrode. In the purely electrolytically operated light valve this plating-out, incident to deplating, had imposed rigid limitations upon the design of the system; it had been necessary to prevent the counter electrode from interfering with the light transmission pattern. The limitations could be overcome in various ways and with the use of various light transmission patterns; however, the new and improved arrangement, provided by this improvement, appears to offer by far the best solution among the variants considered thus far.

One of the arrangements illustrated in the earlier application, mentioned above, had used a counter-electrode positioned in a corner area of a cell; the cell then comprised an electrically conductive glass plate opposite an electrically insulative glass plate. This arrangement was optically versatile as it suited a great variety of light transmission patterns, but was relatively slow as it involved a substantial average distance of and resistance to the transfer of ions.

Another arrangement, disclosed in said earlier application, employed a pair of conductive surfaces, one opposite the other, thereby allowing the use of minimum average distances between electrodes and the corresponding use of rapid light shuttering action; that arrangement, however, required a more limited light stream pattern, which at no time relied upon passage of light through more than one optically transmissive, electrically conductive surface.

Each of these arrangements can be used in accordance with the new method hereof, that is, with a self-erasing plating solution and with unidirectional application of current. Frequently, however, it is desirable to make the light valve action fast and yet to make the light transmission patterns highly flexible, including therein for instance the pattern wherein a light stream passes through a cell formed of closely spaced transparent plates. This has become possible by means of the new apparatus, shown herein.

In this apparatus the problems of plating-out metal at the counter-electrode are substantially eliminated by the use of the body of self-erasing plating solution 10. This solution, as mentioned, is disposed between a first conductive glass plate 11, periodically covered by metal film 28, and a second conductive glass plate 12, the latter being kept free of such a film by the presence of said solution and by the feature that electric current is passed through the cell only in one direction. By virtue of these arrangements the conductive surface portions of both light transmissive plates are disposed co-extensively across the light path; their average distances from one another are accordingly very close; serious disturbance of the light valve action is nevertheless avoided; the plating resistance is thus minimized and a particularly high speed of light shuttering action is obtained.

A few remarks may be indicated about ways in which the oxidizing or self-erasing plating solution can be formulated. It is known to persons skilled in the art of metal plating that various solutions for such plating can be provided, with various added so-called oxidizers, that is, solutes tending to counteract the plating-out of metal during application of a plating potential and to attack and remove the plated-out metal after such application.

In the plating type of a light value it is often preferred, although by no means essential for all applications, that the solution contain silver, which is known to be an excellent light reflecting agent when plated-out as a metallic film, and that the solution contain a metal complexing agent, particularly a halide. For instance, silver bromide (AgBr) can advantageously be dissolved in a concentrated solution of lithium bromide (LiBr). It is also possible to dissolve silver iodide (AgI) in a solution of sodium iodide (NaI). For instance I have effectively used a bath containing up to 0.3 mole of silver bromide, or up to 3 moles of silver iodide, per liter of a 5 to 10 molar solution of the alkali halide.

When such a solution is provided in cell 10 and when voltage is suitably applied thereto, as shown in FIGURE 3 hereof, silver is plated-out as film 28 on conductive plate 12, subject to a tendency, on disconnection of the electrical potential, toward a so-called oxidizing reaction leading to re-formation and re-dissolution of the silver salt and disappearance of the metal film, all this according to the equation:

$$(1) \qquad 2AgBr \rightleftharpoons 2Ag + Br_2$$

The indicated reactions can be repeated cyclically any number of times. When establishing a suitable plating potential by capacitor 142 and/or battery 144 I enforce the reaction indicated by the upper arrow; when removing such potential I cause the reaction indicated by the lower arrow. In this sense, then, the bromine salt of silver (AgBr) is a self-erasing plating agent.

Both plating and deplating reactions can further be supplemented and promoted. The use of a suitable complexing agent such as lithium bromide (LiBr) gives rise to the presence, pursuant to plating, of a lithium-bromine-oxygen compound ($LiBrO_3$); pursuant to the so-called oxidizing of the metal it gives rise to the presence of lithium hydroxide (LiOH). More specifically the added agents cause the following further reactions:

$$(2) \quad 6AgBr + 6LiOH \rightleftharpoons 6Ag + LiBrO_3 + 3H_2O + 5LiBr$$

The last mentioned reactions (2) not only supplement the aforementioned reactions (1) in that they tend readily to form soluble metal salt (AgBr) when the plating potential is removed; they also greatly promote the aforementioned plating reaction (1) by the presence of the hydroxide. Thus it will be seen that a particularly effective, self-erasing plating agent is provided by a solution which contains a soluble salt (AgBr or AgI) of the metal (Ag) to be plated-out and which also contains, as a complexing agent, a substance (Br or I) which can contribute to forming the soluble metal salt and which is capable of forming an oxidizing compound (such as $LiBrO_3$, $Br_2$ or $I_2$).

While using and testing the new method I have found that the solution of metal salt and complexing agent produced better results after some standing. I have concluded that the water of the solution container dissolved oxygen and that certain amounts of the lithium-bromide compound ($LiBrO_3$) were formed thereby, from the originally supplied agent (LiBr), prior to plating. Such compound can also be formed by the plating process itself, but the amounts so formed would be too small to explain the improvement which I have observed.

Accordingly it is my preference to provide for the formation of such an oxygen-containing compound ($LiBrO_3$), in the solution of metal salt (AgBr) and complexing agent (LiBr). The compound can be formed by simply adding oxygen (O), that is, by aerating the solution ($H_2O$, AgBr, LiBr) prior to the actual use of the new device and by thus forming the lithium-bromine-oxygen compound ($LiBrO_3$).

Only a single method of carrying out the new method has been described and only a single apparatus has been illustrated (other usable forms being shown in said earlier application); however, it should be understood that the details hereof are not to be construed as limitative of the invention, except insofar as is consistent with the scope of the following claim.

I claim:

Apparatus for selective reflection and non-reflection of light, comprising:

(1) a container having a pair of light transparent walls, each wall having an electrically conductive, generally transparent and non-light reflective surface structure;

(2) a body of plating solution in said container for plating out light reflecting metal on one of said surface structures, said body of solution having an agent therein for oxidizing such metal when plated out, and being interposed between and in contact with said surface structures;

(3) a plating circuit for said container, including an electrically chargeable capacitor;

(4) a recharge circuit for said capacitor, including a first and relatively powerful source of D.C. potential;

(5) means for counteracting the oxidizing of the plated out metal, comprising a second and relatively weak source of D.C. potential;

(6) switch means in said circuits for connecting said capacitor alternately to said first source for recharging, and to said conductive surface structures for said plating out of reflective metal; and (7) additional switch means in said circuits for alternately connecting and disconnecting said second source, to and from said surface structures, to pass electric current through the body of solution upon such connecting to counteract oxidizing of metal by said agent, and to interrupt such current by such disconnecting to cause said oxidizing to make the surface structure non-reflective.

References Cited by the Examiner

UNITED STATES PATENTS

| | | | |
|---|---|---|---|
| 1,525,554 | 2/1925 | Jenks | 88—61 |
| 2,575,712 | 11/1951 | Jernstedt | 204—228 |
| 2,596,515 | 5/1952 | Watkins et al. | 88—61 |
| 2,756,165 | 7/1956 | Lyon. | |

FOREIGN PATENTS

| | | |
|---|---|---|
| 1,228,105 | 3/1960 | France. |
| 241,636 | 10/1925 | Great Britain. |

JEWELL H. PEDERSEN, *Primary Examiner.*

EMIL G. ANDERSON, *Examiner.*